US011496700B1

United States Patent
Elizov et al.

(10) Patent No.: US 11,496,700 B1
(45) Date of Patent: Nov. 8, 2022

(54) HDR IMAGE SENSOR EMPLOYING MULTI-TAP PIXEL ARCHITECTURE AND METHOD FOR OPERATING SAME

(71) Applicant: SAMSUNG ELECTRONICS CO., LTD., Suwon-si (KR)

(72) Inventors: Roee Elizov, Herzliya (IL); Yoel Yaffe, Modiin (IL); Amit Eisenberg, Kiryat Ono (IL); Shy Hamami, Ganey-Tikva (IL)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/237,631

(22) Filed: Apr. 22, 2021

(51) Int. Cl.
*H04N 5/355* (2011.01)
*H04N 5/378* (2011.01)

(52) U.S. Cl.
CPC ....... *H04N 5/3559* (2013.01); *H04N 5/35581* (2013.01); *H04N 5/378* (2013.01)

(58) Field of Classification Search
CPC .. H04N 5/3559; H04N 5/35581; H04N 5/378; H04N 5/372; H04N 4/353
See application file for complete search history.

(56) References Cited

U.S. PATENT DOCUMENTS

| | | | |
|---|---|---|---|
| 10,009,558 B2 | 6/2018 | Lule et al. | |
| 2011/0089471 A1 | 4/2011 | Buettgen et al. | |
| 2013/0135486 A1* | 5/2013 | Wan | H04N 5/772 348/207.99 |
| 2018/0288343 A1* | 10/2018 | McCarten | H04N 5/37452 |
| 2022/0035038 A1* | 2/2022 | Oh | H01L 27/14612 |

OTHER PUBLICATIONS

Silsby, et al., "A 1.2MP 1/3" CMOS Image Sensor with Light Flicker Mitigation", ON Semiconductor, 4 pages.
Callenberg, et al., "Snapshot Difference Imaging using Time-of-Flight Sensors", arXiv:1 705.07108v1 [cs.CV] May 19, 2017, 10 pages.
Jung, et al., "A 4-tap global shutter pixel with enhanced IR sensitivity for VGA time-of-flight CMOS image sensors", S&T International Symposium on Electronic Imaging 2020, Imaging Sensors and Systems, pp. 103-1-103-5.

* cited by examiner

*Primary Examiner* — Nhan T Tran
(74) *Attorney, Agent, or Firm* — F. Chau & Associates, LLC (57) ABSTRACT

An image sensor may include control circuitry, a plurality of pixels, and an image processor. Each pixel includes a photodetector, at least first and second storage nodes, and transfer circuitry. The transfer circuitry is responsive to control signals generated by the control circuitry to transfer first charges generated by the photodetector during a first exposure time within a frame period to the first storage node. Second charges may be generated by the photodetector during a second, longer exposure time during the frame period, and transferred to the second storage node. The image processor may generate image frame data based on output voltage samples derived from the first and second charges of each of the plurality of pixels.

13 Claims, 10 Drawing Sheets

HDR IMAGE SENSOR EMPLOYING MULTI-TAP PIXEL ARCHITECTURE AND METHOD FOR OPERATING SAME

TECHNICAL FIELD

The present disclosure relates generally to image sensors and more particularly to image sensors for generating high dynamic range (HDR) images.

DISCUSSION OF THE RELATED ART

In an HDR image sensor, dynamic range is increased relative to traditional imaging through multi-sampling of local regions of a scene, so that brighter and darker portions of the scene are digitized separately. Short exposure times are used to obtain samples in brighter portions of a scene, and longer exposure times are used to sample darker portions of the scene. Each region of the scene (e.g., a region defined by a single pixel or a group of adjacent pixels) may be determined as either a bright region, a dark region or, in some HDR schemes, an intermediate luminance region. ND conversion with a fixed number of bits may be used to digitize a selected sample(s) of each region, resulting in a higher resolution image and higher overall dynamic range.

To obtain multiple samples for the local regions, current methods may take different exposures of the same scene by either: (1) sampling two or more consecutive frames, each at a different exposure; or (2) exposing groups of pixels within the same frame at different exposure periods. Since the scene is sampled in different time periods, these methods cause motion-artifacts when merging the multi-exposure data into a single HDR image. In case (2), resolution is also compromised.

Another technique known as a dual gain conversion obtains two samples from a pixel using the same exposure but with different conversion gains to obtain bright condition and dark condition samples. (A low conversion gain sample is used for a bright condition and a high conversion gain sample is used for a dark condition sample.) This scheme reduces motion-artifacts but suffers from inflexibility as well as accuracy limitations due to the difficultly in precisely controlling the relative gains for each pixel. Further, the dynamic range extension is limited by the dual gain ratio, which is particularly constrained for small pixel sensors.

SUMMARY

In an aspect of the inventive concept, an image sensor includes a control circuit, a plurality of pixels, and an image processor. Each pixel includes a photodetector, at least first and second storage nodes, and transfer circuitry. The transfer circuitry is responsive to control signals generated by the control circuitry to transfer first charges generated by the photodetector during a first exposure time within a frame period, to the first storage node. Second charges are generated by the photodetector during a second, longer exposure time during the frame period, and transferred to the second storage node. The image processor may generate image frame data based on output voltage samples derived from the first and second charges of each of the plurality of pixels.

The image frame data may be a high dynamic range (HDR) image frame.

The first exposure time may be an integrated exposure time of a sequence of first sub exposure times, and the second exposure time may be an integrated exposure time of a sequence of second sub exposure times interspersed with the first sub exposure times. In this manner, since the first and second output voltage samples each represent incident light received in time intervals distributed over approximately the same overall timeframe, motion artifacts that may otherwise be present in the generated image frame may be reduced.

In another aspect, an operating method of an image sensor including a plurality of multi-tap pixels is provided. The method involves, for each of the multi-tap pixels: (i) during an exposure frame period, activating a photodetector responsive to incoming light for a plurality K of exposure periods and thereby accumulate K respective photocharge packets, at least two of the K exposure periods being of different lengths; and (ii) transferring the photocharge packets to K storage nodes within the respective pixel. Voltage samples are obtained from the plurality of multi-tap pixels, derived from the photocharge packets in the K storage nodes. HDR image frame data is generated based on the voltage samples.

In another aspect, a non-transitory computer-readable recording medium stores instructions that, when executed by at least one processor of an image sensor comprising a plurality of multi-tap pixels, implements a method for generating HDR image frame data. The method includes, for each of the multi-tap pixels: (i) during an exposure frame period, activating a photodetector responsive to incoming light for a plurality K of exposure periods and thereby accumulate K respective photocharge packets, at least two of the K exposure periods being of different lengths, where each of the K exposure periods is an integrated exposure period of a respective one of K sequences of a plurality n of sub exposure periods, each of the K sequences being interspersed with each of the other of the K sequences; and (ii) transferring the photocharge packets to K storage nodes within the respective pixel. Correlated double sampling (CDS) voltage samples are obtained, based on the photocharge packets in the K storage nodes in each of the multi-tap pixels. The CDS voltage samples are digitized, and HDR image frame data is obtained from the digitized CDS voltage samples.

BRIEF DESCRIPTION OF THE DRAWINGS

The above and other aspects and features of the inventive concept will become more apparent from the following detailed description, taken in conjunction with the accompanying drawings in which like reference characters indicate like elements or features. Various elements of the same or similar type may be distinguished by annexing the reference label with an underscore and second label that distinguishes among the same/similar elements (e.g., _1, _2), or directly annexing the reference label with a second label (e.g., 120i, 120j). However, if a given description uses only the first reference label (e.g., 120), it is applicable to any one of the same/similar elements having the same first reference label irrespective of the second label. Elements and features may not be drawn to scale in the drawings.

DETAILED DESCRIPTION OF EMBODIMENTS

The following description, with reference to the accompanying drawings, is provided to assist in a comprehensive understanding of certain exemplary embodiments of the inventive concept disclosed herein for illustrative purposes. The description includes various specific details to assist a person of ordinary skill the art with understanding the inventive concept, but these details are to be regarded as merely illustrative. For the purposes of simplicity and clarity, descriptions of well-known functions and constructions may be omitted when their inclusion may obscure appreciation of the inventive concept by a person of ordinary skill in the art.

In embodiments of an image sensor and method for driving the same described below, the sensor includes a pixel array in which each pixel may be a multi-tap pixel having a single photodetector and multiple "taps" from the photodetector to respective storage nodes, e.g., floating diffusion (FD) nodes. Each tap includes transfer circuitry to transfer photocharge generated by the photodetector during an image frame to a different storage node. At least two of the taps transfer photocharge generated under different exposure time durations. Voltage produced at each storage node due to the transferred photocharge during a frame is read out as an image sample at the end of the frame. In this manner, multiple samples corresponding to at least long and short exposures (and in some cases, one or more medium exposures) are provided to an image processor each frame, enabling the image processor to generate HDR image data using a selected one of the samples per pixel for each frame. Further, to reduce motion artifacts due to motion within a frame period, each exposure time may be an integrated exposure time of a sequence of segregated sub exposure times. The sub exposure times of one integrated exposure time may be interspersed with the sub exposure times of other integrated exposure times. In this manner, since the storage node voltages each represent incident light received in time intervals distributed over approximately the same overall timeframe, motion artifacts that may otherwise be present in the generated image frame are reduced.

Figure 1:
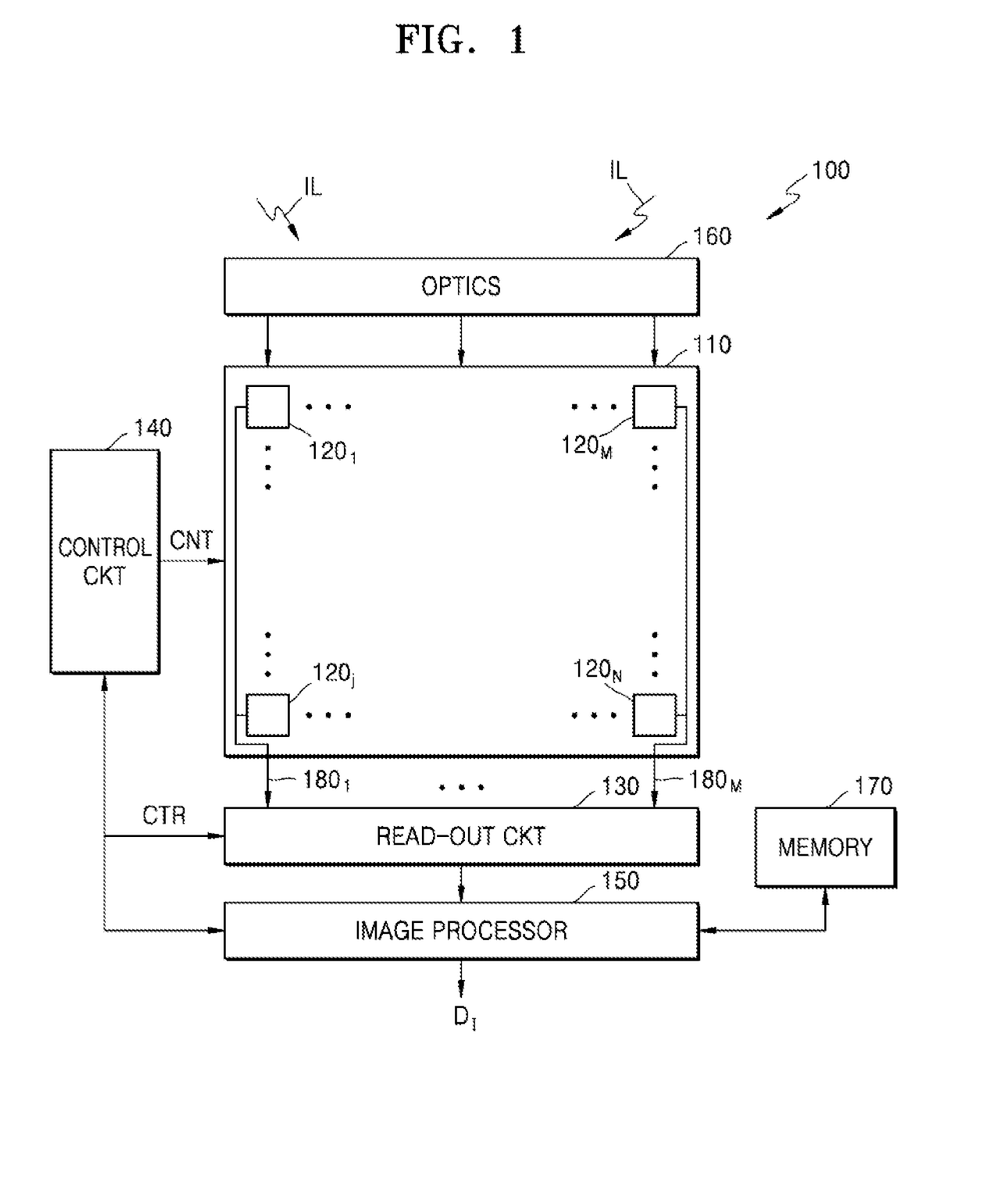
FIG. 1 is a high level block diagram of an example image sensor according to an embodiment.

FIG. 1 is a high level block diagram of an example image sensor, 100, according to an embodiment. Image sensor 100 may include a pixel array 110, optics 160, a control circuit ("control circuitry") 140, a read-out circuit 130, an image processor 150, and memory 170. Pixel array 110 includes an array of N pixels $120_1$ to $120_N$ which may be arranged in rows and columns. The number N of pixels 120 may be designed according to an intended application. For instance, image sensor 100 may have upwards of one million pixels 120 when designed for a typical HDR capable camera application. Optics 160 includes one or more lenses to focus incident light IL upon pixels 120. Each pixel 120$i$ (i=any integer from 1 to N) of pixel array 110 may be a multi-tap pixel with just a single photodetector and several storage nodes. The lenses of optics 160 may include microlenses, such as one microlens for each pixel 120$i$.

Control circuit 140 may cooperate with image processor 150 to provide control signals CNT to pixel array 110 to control transistor switches/gates within pixels 120. (Herein, the term "gate" may be used interchangeably with "transistor" when the transistor operates primarily as a switch and/or as a charge storage element.) The switches may be controlled so that each pixel 120 provides output voltage samples representing incident light upon the pixel 120. The control signals CNT control transfer circuitry to transfer photocharges (hereafter, "charges") from the photodetector generated during the respective exposure times. The charges are transferred to a plurality of respective storage nodes to provide multiple voltage samples for each pixel every frame, where at least two samples correspond to different respective exposure times. As explained in detail below, each exposure time may be an integrated exposure time of a plurality of alternating sub exposure times, to reduce motion artifacts. Motion artifacts may be reduced by configuring each integrated exposure time (corresponding to one sample) to represent incident light distributed over approximately the same overall timeframe. The control signals CNT may also control outputting of the integrated voltages during a read-out period of the frame, and may control resetting of the storage nodes before and after the read-out for correlated double sampling (CDS) based noise reduction. Control circuit 140 may include a processor that executes instructions to at least partially carry out the control circuit's operations; the instructions may be read from an internal memory of control circuit 140, or from memory 170.

Control circuit 140 may also control operations of read-out circuit 130 by providing timing and control signals CTR to synchronize voltage read-out from the pixels of one row at a time, sequentially from column to column. For instance, pixel array 110 may have M columns of pixels 120 and M corresponding column line sets $180_1$ to $180_M$, where each column line set 180$i$ (i=any integer from 1 to M) includes one or more column lines. (In FIG. 1, pixels $120_1$ and $120_j$ are illustrated as pixels of a first column, where each pixel of the column is connected to the column line set $180_1$; pixels $120_M$ and $120_N$ are depicted as pixels of the $M^{th}$ column.) In some embodiments, each column line set 180$i$ includes two or more column lines. This enables voltages at different storage nodes within each pixel of the column to be read out to different respective column lines, thereby realizing faster data read-out. In this case, there may be as many as (Z×M) column lines, where Z is an integer in the range of two to K, and K is the number of storage nodes per pixel 120.

Read-out circuit 130 may include correlated double sampling (CDS) circuitry to cancel noise during the readout of the storage node voltages (which are analog voltages). Read-out circuit 130 may further include an analog to digital converter (ADC) to convert the noise reduced output voltages from the CDS circuitry to digital signals having corresponding digital values. Image processor 150 processes the digital signals to generate one or more HDR frames, depending on whether the application is for a still photo (single frame, in some cases) or video (composed of multiple frames). To this end, image processor 150 may combine short exposure samples from some pixels 120 of pixel array 110 and long exposure samples from other pixels 120 (and one or more medium exposure samples, if available) to generate a composite HDR image data frame. Short exposure samples for the HDR image are selected for pixels 120 determined to have received light within a high luminance range. Long exposure samples are selected for pixels determined to have received light within a low luminance range. Medium exposure samples may be selected for pixels determined to have received light in a medium luminance range between the low and high luminance ranges. By providing such n-bit data over two or more ranges of luminance rather than for the entire range of luminance, resolution enhancement and dynamic range expansion are achieved. Image processor 150 may execute instructions read from memory 170 to perform its operations. Image processor 150 may further output interim data as well as final HDR image data $D_I$ for storage in memory 170 and/or output the final HDR image data $D_I$ to a display system or a network. Image processor 150 may also execute a real time auto-exposure algorithm, discussed later, which may be used to dynamically control exposure times based on a measure of the illuminance environment.

Figure 2:
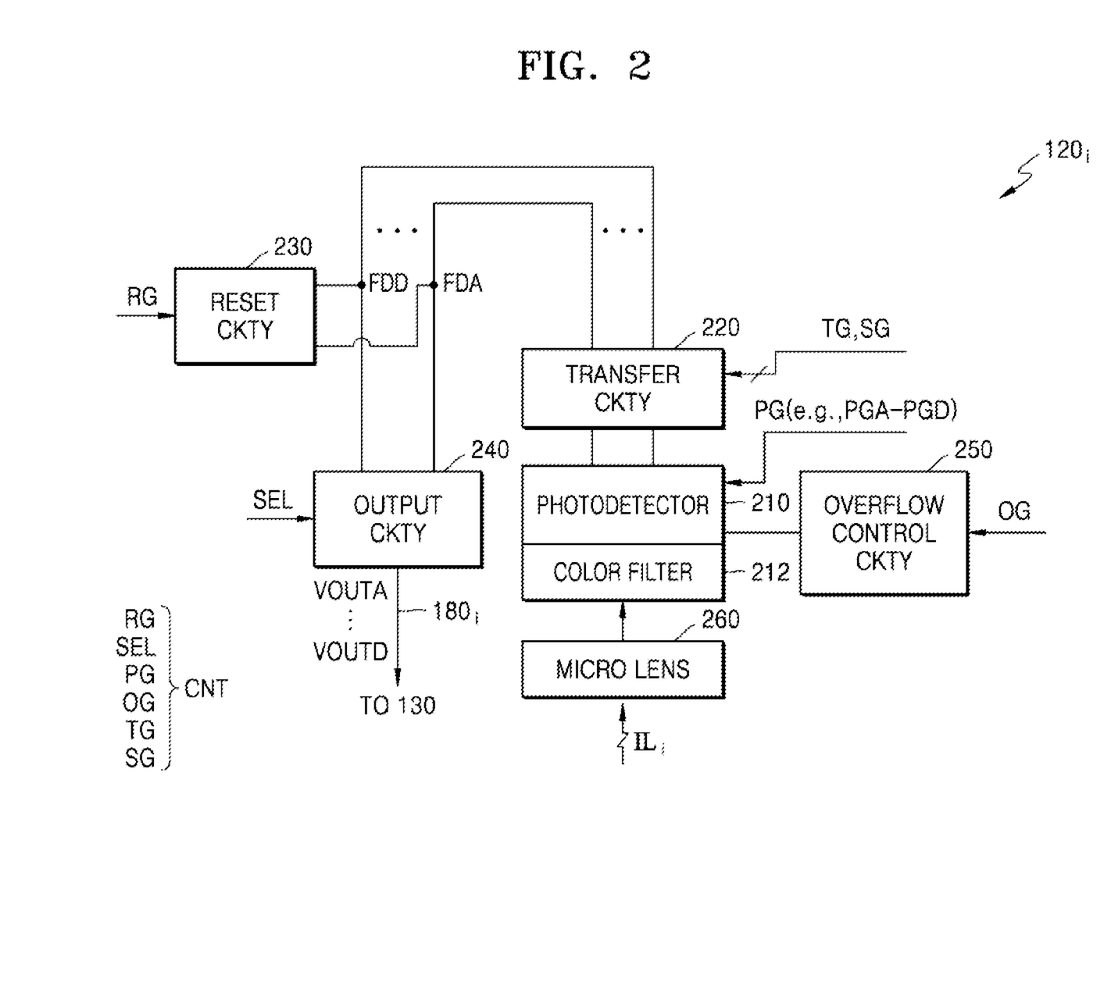
FIG. 2 is a block diagram of an example pixel within the image sensor.

FIG. 2 is a block diagram of an example pixel 120i within pixel array 110 (all of the pixels within pixel array 110 may have the same configuration). Pixel 120i is a multi-tap pixel that may include a photodetector (PD) 210, transfer circuitry 220, a plurality K of storage nodes (K=any integer of two or more), e.g., floating diffusion (FD) areas FDA-FDD, reset circuitry 230, output circuitry 240 and overflow control circuitry 250, all of which may be integrally formed on a common semiconductor substrate. Some examples of photodetector 210 include a photodiode, a pinned photodiode and a phototransistor photo-gate. A single microlens 260, which may be considered part of the image sensor optics 160, may be used to focus a portion ILi of the incident light IL upon pixel 120i. The use of a single photodetector 210 and single microlens 260 for pixel 120i avoids drawbacks of related art designs employing two or more photodetectors and corresponding microlenses in terms of complexity, leakage and crosstalk between the multiple elements. A color filter 212 may filter light provided from microlens 260 so that pixel 120i is dedicated for measuring luminance values of a specific color, e.g., green, blue or red. Color filter 212 may be omitted for strictly black and white sensing applications. A back reflection layer (not shown) may also be included on a second side of pixel 120i opposite to a first side facing microlens 260.

Control signals CNT provided from control circuit 140 may include photogate signals PG (e.g., PGA, PGB, PGC and PGD discussed in an example below), transfer gate signals TG, storage gate signals SG, reset signals RG, select signals SEL and an overflow gate signal OG. Each photogate signal PG may be applied to a respective photogate of photodetector 210, where the photogate enhances PD 210 and guides photo-generated electrons (photocharge) collected by PD 210 into a respective storage area/storage node. Each signal PG may be a pulse or sequence of pulses that initiates a "tap" to transfer photocharge generated by PD 210. For example, the number of photogates of photodetector 210 may equal the number of storage nodes FD. In the tap mechanism, during the time that the pulse(s) PG is applied, photocharge may be transferred to a respective one of storage areas within transfer circuitry 220, and subsequently transferred to storage nodes FDA-FDD. The charge transfer may be controlled by transfer gate signals TG and storage gate signals SG. The time during which charges are generated in correspondence with a signal PG may be denoted an exposure time associated with the storage node FD to which the charge is subsequently transferred. When PG pulses are provided in a sequence during a single frame, charge may be built up in a storage area gradually over a sequence of sub exposure times, and then transferred from the storage area to a storage node FD. In this case, the exposure time associated with the storage node FD may be denoted an "integrated exposure time".

Select signals SEL applied to output circuit 240 may be provided at the end of the exposure times during a frame to select one of output voltages VOUTA-VOUTD of the storage nodes FDA-FDD, respectively, for data sample read out. If correlated double sampling (CDS) is implemented, a noise sample at an FD node may be read out as VOUT just prior to the transfer of charge to that FD node. The noise sample may then be subtracted from the VOUT sample taken after the charge transfer to the FD node by CDS circuitry within readout circuit 130. One or more column lines of a column line set 180i connects to pixel 120i to route voltages VOUTA-VOUTD to read-out circuit 130. After read-out (and/or just before noise sample read-out), reset signals RG may applied to reset circuit 230 to reset the voltages at storage nodes FDA-FDD to initial values. Overflow gate signal OG is applied to photodetector 210 to discharge its parasitic capacitance as desired.

Figure 3:
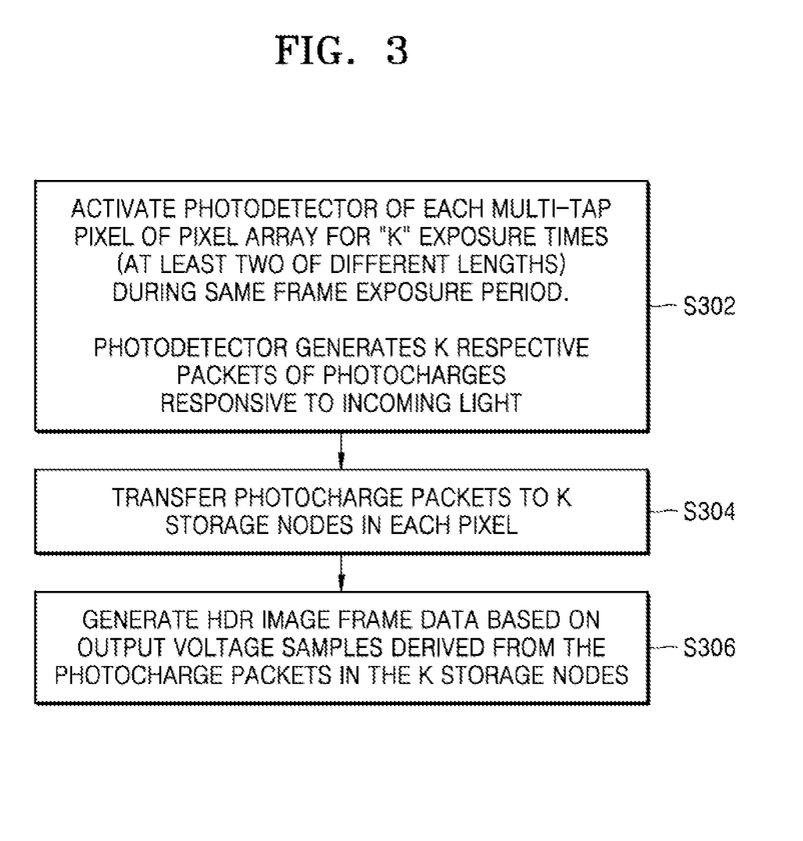
FIG. 3 is a flow chart of an example operating method of an image sensor having multi-tap pixels to generate an HDR image.

FIG. 3 is a flow chart of an example operating method of image sensor 100. To generate HDR image data for one frame, a photodetector of each multi-tap pixel 120 of the pixel array 110 may be activated for "K" exposure periods (interchangeably, "exposure times"), at least two of which are different, during the same "frame exposure period" (operation S302). Herein, a frame exposure period refers to a portion of a "frame period". In the frame exposure period, a photodetector accumulates charge, whereas a frame period may include additional time intervals for reading out pixel data and resetting/initializing storage nodes, etc. Note that each of the K exposure times may be an "exposure integration time", discussed below. The K exposure periods may be non-overlapping exposure periods. By activating the photodetector for the K exposure periods, the photodetector generates K respective packets of photocharges responsive to incident light.

The K photocharge packets may be transferred to K respective storage nodes, e.g., FD nodes, in each pixel, in response to control signals (e.g., TG, SG) applied to the pixel (S304). In embodiments employing CDS/global shuttering, the transfer of the photocharge packets to the storage nodes may be a multi-stage process in which the packets are transferred to an interim storage area (e.g., an active area of an SGX transistor, discussed below) during an interim stage. In other cases, the photocharge packets are transferred directly from the photodetectors to the storage nodes. In either case, HDR image frame data may be generated based on digital data representing output voltage samples derived from the photocharge packets in the K storage nodes (S306). This operation may involve amplifying, by the output circuitry 240, a noise sample at the storage node, and a signal sample ("signal plus noise") at the storage node, at different times, to generate a pair of output voltage samples. The dual sampling technique allows CDS circuitry to subtract the noise from the signal sample to provide a more accurate luminance sample. The noise from signal subtraction may be performed in either the analog or digital domain. A digital sample representing the noise-reduced voltage is applied to image processor 150, which then generates the HDR image data.

Figure 4:
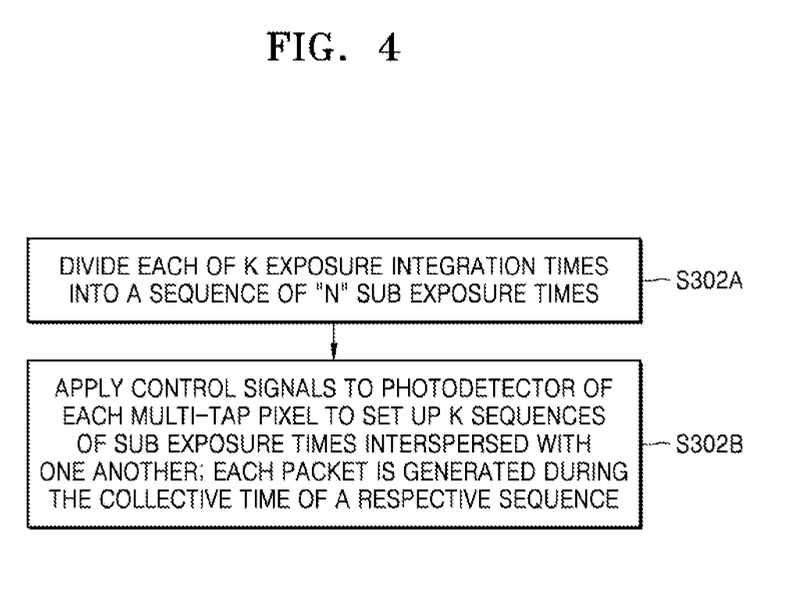
FIG. 4 is a flow chart illustrating example operations for activating a photodetector of a pixel in the method of FIG. 3 to obtain image data for different exposure integration times in an interspersed manner.

FIG. 4 is a flow chart illustrating example operations for activating a photodetector in operation S302 of FIG. 3. Each of K integrated exposure times is set up by dividing the same into a sequence of "N" segregated sub exposure times (S302A). Control signals are applied to the photodetector of each pixel to arrange K sequences of such sub exposure times interspersed with one another (S302B). Each photocharge packet is generated during the collective time of a respective sequence of the K sequences. Because the K integrated exposure times are distributed over approximately the same overall frame exposure period, motion artifacts that may otherwise occur are avoided. Examples of sub exposure time sequences are described below in connection with FIGS. 5A-5B.

Figure 5A:
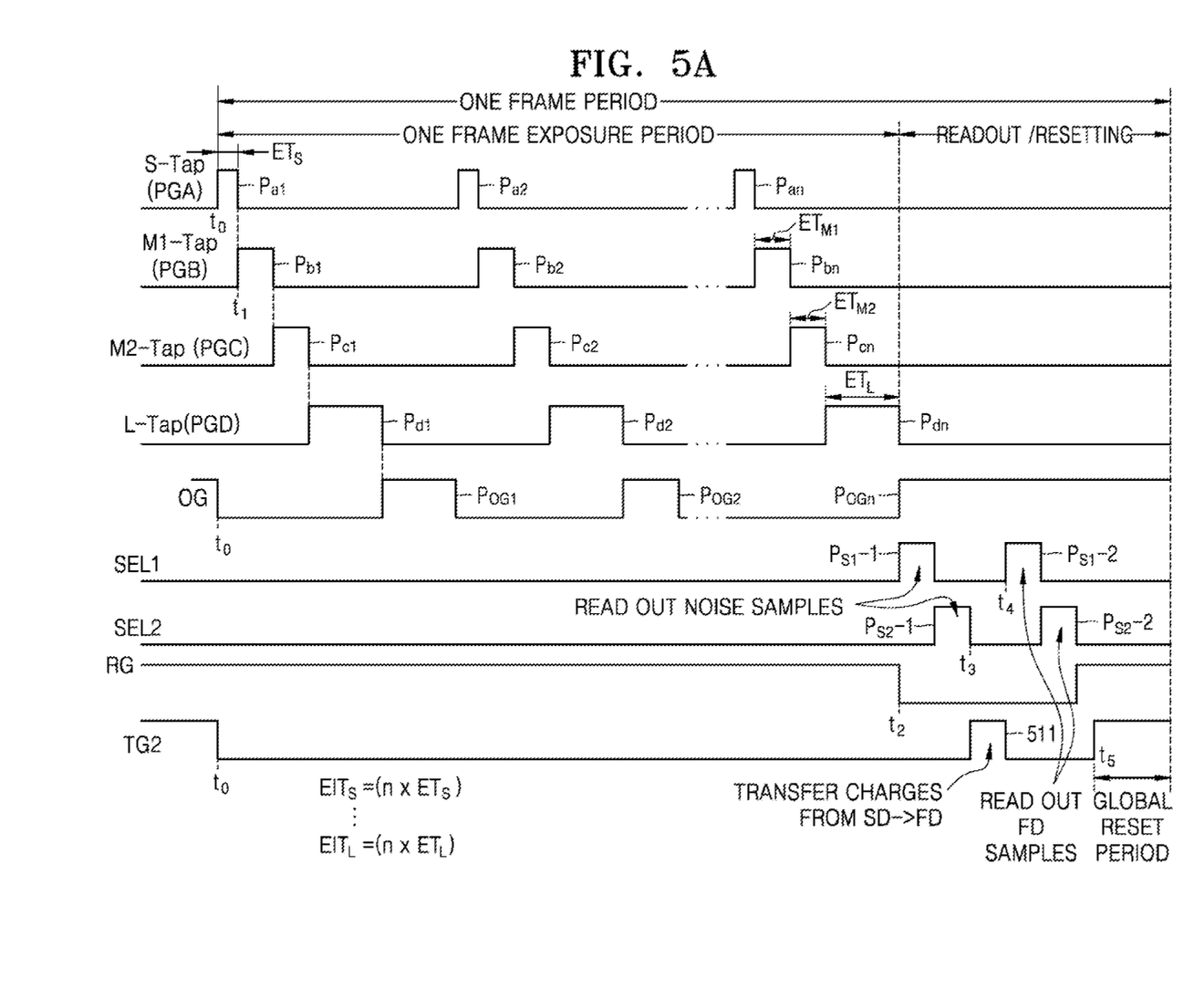
FIG. 5A is a timing diagram illustrating an example of how control signals may be applied to, and image data may be read out from, the pixel of FIG. 2 or FIG. 6 during a frame.
Figure 5B:
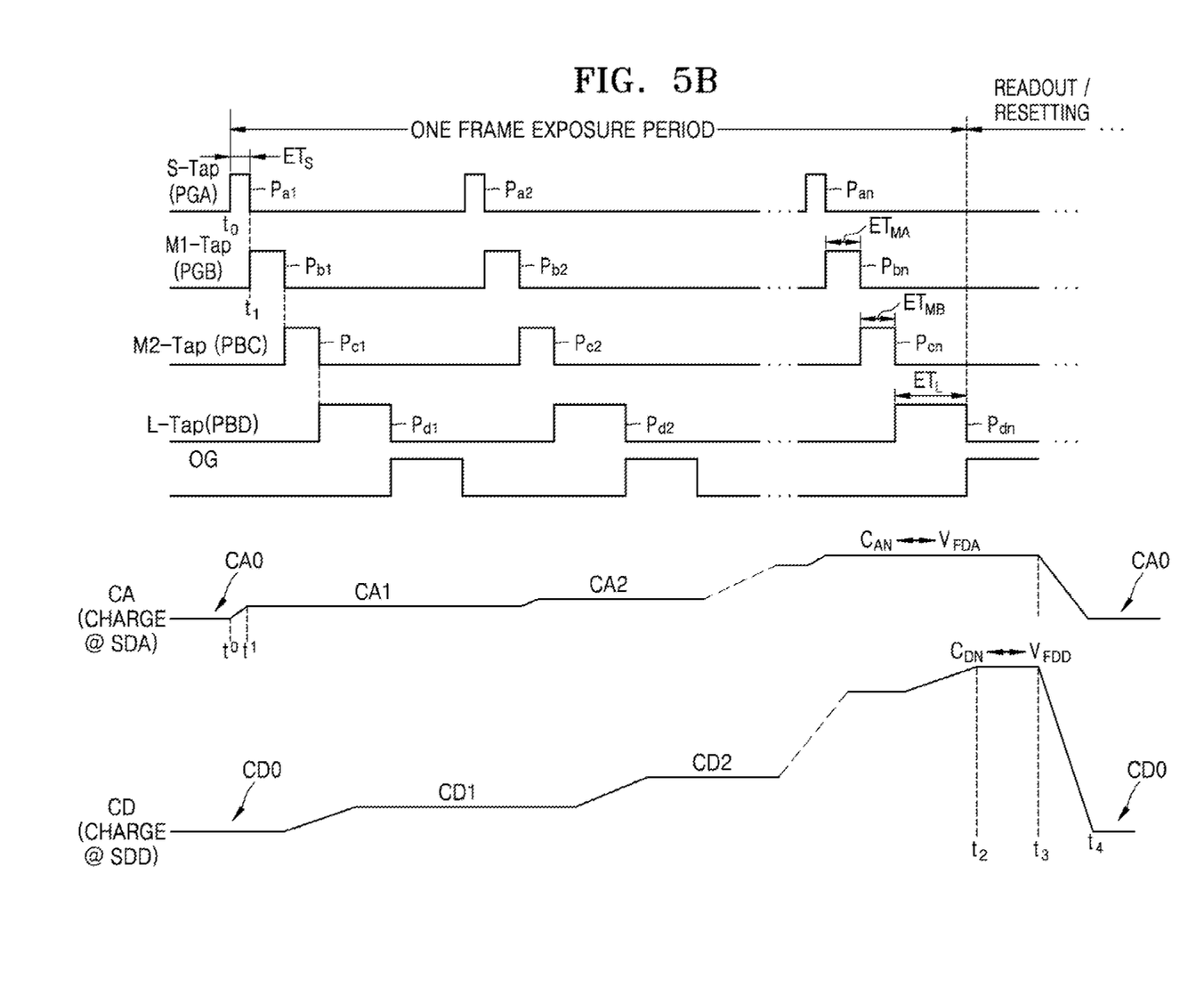
FIG. 5B is a timing diagram illustrating how photocharges in the pixel of FIG. 2 or FIG. 6 may be built up and transferred to storage nodes during a frame.
Figure 6:
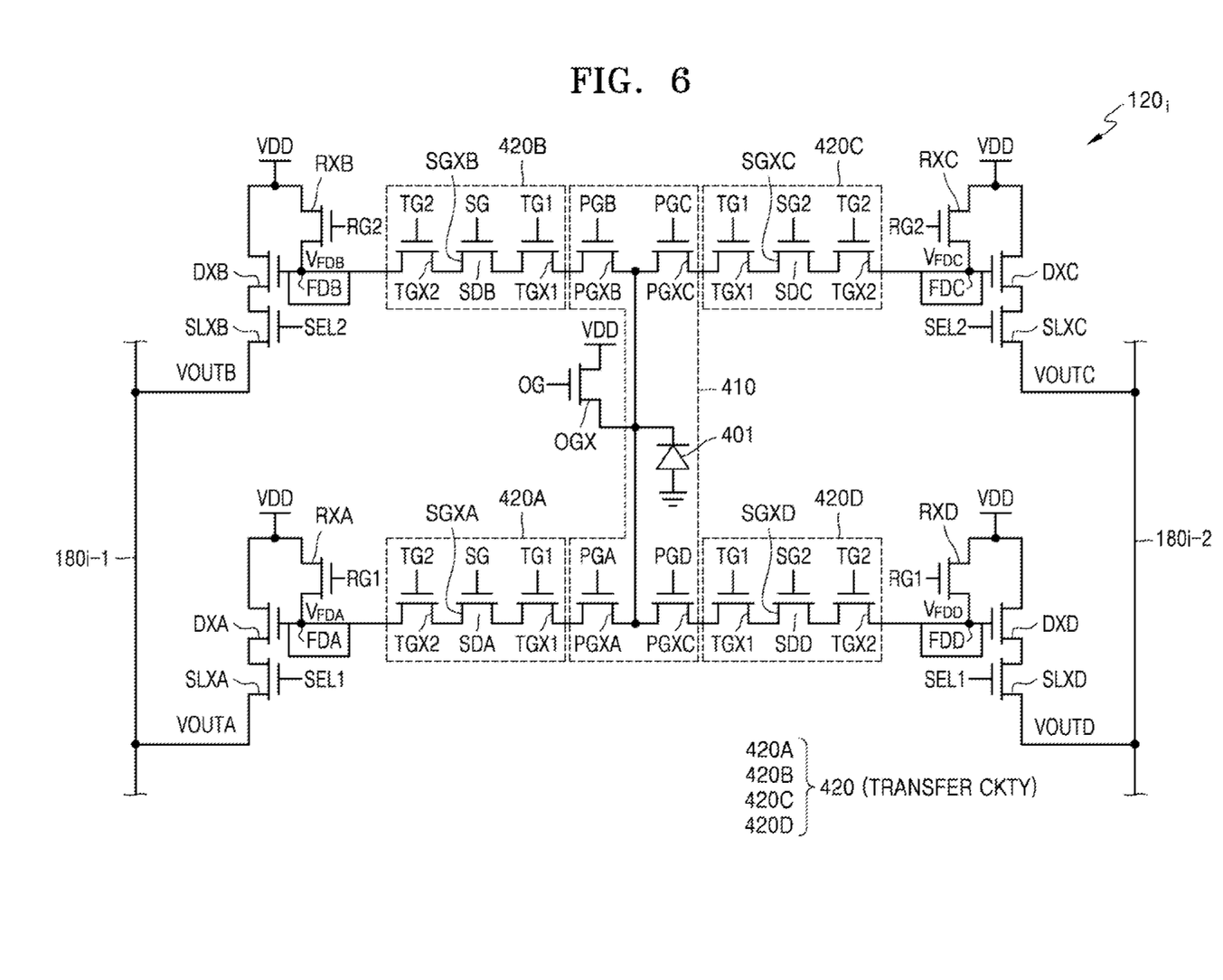
FIG. 6 is a schematic diagram of example circuitry within a pixel.

FIG. 5A is a timing diagram depicting example control signals that may be applied to pixel 120*i* of FIG. 2 (or FIG. 6) during a frame. FIG. 5B is a diagram illustrating how photocharge may be built up in storage areas within pixel 120*i*, in correspondence with the control signals. FIG. 6 is a schematic diagram of an example circuit configuration of a pixel 120*i* to which the control signals of FIGS. 5A-5B may be applied.

Referring collectively to FIGS. 5A-5B and 6, an example is presented for the case where pixel 120*i* has four storage nodes FDA, FDB, FDC and FDD, each for storing a voltage produced from charge accumulated in an interim storage area "SD" during a respective exposure time during the frame. (Note that the voltage stored at any storage area SD or storage node FD may be referred to herein interchangeably as stored photocharge or a stored photocharge packet.) The example circuit configuration of pixel 120*i* is configured for generating four output voltage samples VOUTA, VOUTB, VOUTC and VOUTD which are applied to read-out circuit 130. To this end, pixel 120*i* may include a photodetector 410, a transfer circuit 420 (example of transfer circuit 220), floating diffusion storage nodes FDA, FDB, FDC and FDD, reset transistors RX, driving transistors DX, selection transistors SLX and one or more overflow gate (OG) transistors OGX.

Photodetector 410 may include a photodiode 401 or other photosensitive element, and photogate field effect transistors ("photogates") PGXA, PGXB, PGXC and PGXD. Photocharge packets generated in response to incident light upon PD 410 may be transferred by photogates PGXA-PGXD to respective storage areas SD during exposure times at which photogate signals PGA-PGD are respectively applied to the gate terminals of the photogates. One or more overflow transistors OGX, part of overflow circuitry 250 of FIG. 2, may each have a gate terminal receiving signal OG, a drain terminal receiving a supply voltage VDD and a source terminal connected to a cathode of photodiode 401.

Transfer circuitry 420 (an example of the transfer circuitry 220 of FIG. 2) may include transfer circuit parts 420A, 420B, 420C and 420D, each having a first shutter transistor TX1, a second shutter transistor TX2 and a storage transistor SGXA, SGXB, SGXC or SGXD coupled between them. Storage areas SDA, SDB, SDC and SDD may be part of the active regions of the storage transistors SGXA-SGXD, respectively. For example, each of the storage transistors SGXA-SGXD may be biased using signals SGA-SGD applied to the gates to form a pinned diode in the active region, thereby forming the storage regions SDA-SDD, respectively. Reset transistors RXA, RXB, RXC and RXD may together form part of the reset circuitry 230 of FIG. 2. Reset transistors RXA-RXD may each have a drain terminal receiving supply voltage VDD, a gate terminal receiving one of RG signals RG1 and RG2, and a source terminal connected to a corresponding one of storage nodes FDA-FDD. Drive transistors DXA, DXB, DXC and DXD and select transistors SLXA, SLXB, SLXC and SLXD may collectively constitute output circuitry 240 of FIG. 2. Drive transistors DXA-DXD may each have a drain connected to receive VDD, a gate terminal connected to one of FD nodes FDA-FDD, and a source connected to a drain of one of select transistors SLXA-SLXD, respectively. Drive transistors DXA-DXD may amplify the voltages at the FD nodes FDA-FDD so as to generate respective output voltages VOUTA-VOUTD. These output voltages may be provided at the sources of transistors SLXA-SLXD during a time at which a gate terminal of SLXA-SLXD receives a SEL1 pulse or a SEL2 pulse.

Storage node FDA may be designated for storing a voltage $V_{FDA}$ produced from a short exposure tap "S-tap". As mentioned, a tap may be understood as a mechanism by which charge flows from the photodetector down a path to a storage node of the pixel and is represented by a signal (voltage/current) at an output node of the pixel for data readout. The term "tap" may also be used herein to refer to the circuit elements of the circuit path within the pixel that implement the charge flow and provide the output signal. A multi-tap pixel may have a configuration allowing charge to flow from the photodetector through multiple paths during the same frame period.

An S-tap in the example of FIG. 6 may include the circuit elements in the path from photogate PGXA to select transistor SXA, i.e., photogate PGXA, transfer circuit part 420A, storage node FDA, reset transistor RXA, drive transistor DXA and select transistor SLXA. Likewise, an "M1-tap" (first medium exposure tap), an "M2-tap" (second medium exposure tap) and an "L-tap" (long exposure tap) may be the circuit elements in the respective paths from photogates PGB, PGC and PGD to select transistors SLXB, SLXC and SLXD, respectively. Note that all of these paths are just arbitrary and can be interchanged as desired, since the control signals CNT may define which path corresponds to which tap.

In the example of FIG. 6, pixel 120*i* is assumed to reside in column "i" of the pixel array, and a column line set 180*i* includes a first column line 180*i*-1 and a second column line 180*i*-2. First column line 180*i*-1 may connect to the sources of transistors SLXA and SLXB. Second column line 180*i*-2 may connect to the sources of transistors SLXC and SLXD. In this manner, a SEL2 pulse applied simultaneously to the gate terminals of transistors SLXB and SLXC (while SEL1 is inactive or "low") may result in VOUTB and VOUTC being concurrently output to column lines 180*i*-1 and 180*i*-2. Likewise, a SEL1 pulse occurring before or after the SEL2 pulse may be simultaneously applied to the gate terminals of transistors SLXA and SLXD and result in VOUTA and VOUTD concurrently output to column lines 180*i*-1 and 180*i*-2. Alternatively, if column line set 180*i* were to be designed as a single column line, the four voltages VOUTA-VOUTD could be output non-simultaneously to the single column line, but this would double the read-out time. In still other examples, column line set 180*i* has three or four column lines to enable simultaneous read-out of three or four voltage samples, which may reduce read-out time further but at the expense of additional complexity.

The exposure time for the S-tap may be controlled by photogate signal PGA. As shown in FIG. 5A, signal PGA is applied as a sequence of "n" pulses ("sub exposure pulses") Pa1-Pan, with the first pulse Pa1 applied between times $t_0$ and $t_1$ as illustrated. Each of these pulses has a pulse width $ET_S$ (=$t_1$-$t_0$) equaling a "sub exposure time". During each sub exposure time, charges due to incident light may be generated by photodetector 410 and transferred through photogate PGXA and shuttle transistor TGX1 of transfer circuit part 420A to storage area SDA. This transfer may be controlled by shuttle gate signal TG1 of transfer circuit part 420A, which may be applied as a sequence of pulses synchronized with the sub exposure pulses. (The shuttle gate signals TG1 in each of the transfer circuit parts 420B, 420C and 420D may be in the form of a sequence of pulses synchronized with the PGB, PGC and PGD pulses (Pb, Pc and Pd pulses), respectively. During the intervals between the sub exposure pulses, the shuttle gate signals TG1 in the respective circuit parts 420A-420D may be LOW, thereby preventing residual photocharge from the adjacent photogate from traveling to the adjacent storage area SD.) Thus, accumulated S-tap photocharge in storage area SDA increases with every pulse Pa. This is depicted in FIG. 5B, which illustrates photocharge CA at the storage area SDA (eventually producing voltage $V_{FDA}$ at storage node FDA) ramping up during the time of pulse Pa1 from an initial charge CA0 (e.g., noise charge) to CA1. The charge CA1 may be maintained until the next pulse Pa2 and then ramped up again during the time of pulse Pa2; and so on. After a final ramp-up during the last pulse Pan, a final amount of charge CAn may be a photocharge packet to be transferred out to storage node FDA to generate voltage $V_{FDA}$. This voltage may be amplified by output circuitry 240 to provide output voltage VOUTA which is subsequently read out.

Accordingly, an exposure integration time $EIT_S$ for the S-tap may be a sum of the sequence of n sub exposure times $ET_S$, i.e., $$EIT_S = n \times ET_S.$$

Similarly, the first medium exposure tap M1-Tap in this example is controlled by photogate signal PGB applied as a sequence of n pulses Pb1-Pbn, each having a pulse width $ET_{M1}$, referred to as a first medium sub exposure time. The first pulse Pb1 of the sequence may begin at time t1 coinciding with the falling edge of pulse Pa1, or shortly thereafter. The second medium exposure tap "M2-Tap" may be controlled by photogate signal PGC which includes a sequence of n pulses Pc1-Pcn, each having a width $ET_{M2}$, referred to as a second medium sub exposure time. Each of pulses Pc1-Pcn may directly succeed a corresponding one of pulses Pb1-Pbn.

The long exposure tap "L-Tap" is controlled by photogate signal PGD, which may be applied as a sequence of n pulses Pd1-Pdn, each having a width $ET_L$ and each directly succeeding a corresponding one of pulses Pc1-Pcn. As illustrated in FIG. 5B, a photocharge "CD" (eventually producing voltage $V_{FDD}$ at storage node FDD), transferred through photogate PDXD to which signal PGD is applied, increases with every pulse Pd in a similar manner as described above for the photocharge CA ("CD0" may be noise charge, "CD1" is charge ramped up after Pd1, etc.). After a final ramp-up during the last pulse Pdn, a final amount of charge CDn is higher than CAn because the integrated exposure time for the L-Tap is higher than that for the S-tap. Correspondingly, a final voltage $V_{FDD}$ is higher than $V_{FDA}$, and the amplified output voltage VOUTD is higher than VOUTA. An analogous voltage build-up during the frame occurs for each of the M1-Tap and the M2-Tap, such that the output voltages VOUTB and VOUTC (not shown in FIG. 5B) are each higher than VOUTA and lower than VOUTD.

Accordingly, the long sub exposure times $ET_L$ are interspersed with the short sub exposure times $ET_S$ during the frame, and are also interspersed with the first medium sub exposure times $ET_{M1}$ and the second medium sub exposure times $ET_{M2}$. Exposure integration times $EIT_{M1}$, $EIT_{M2}$ and $EIT_L$ for the respective taps may be as follows:

$$EIT_{M1} = n \times ET_{M1};$$

$$EIT_{M2} = n \times ET_{M2};$$

$$EIT_L = n \times ET_L.$$

In one embodiment, the exposure integration times $EIT_{M1}$ and $EIT_{M2}$ are equal, and only a single medium exposure sample is used by image processor 150 (when the sample is within the corresponding medium luminance range) to generate the HDR image data for the pixel 120i. In this case, the single medium exposure sample may be an average of the samples VOUTB and VOUTC for the M1-Tap and M2-Tap, respectively. By averaging two samples in this manner, the signal to noise ratio (SNR) for the medium exposure sample may be improved. Alternatively, the exposure integration times $EIT_{M1}$ and $EIT_{M2}$ are unequal, and samples are provided for a total of four exposure ranges per pixel. This scheme may result in still higher resolution in the finally processed HDR image.

With continuing reference to FIG. 5A, the overflow control signal OG may also be applied as a sequence of n pulses $P_{OG1}$-$P_{OGn}$ over the frame period, which pulses may be synchronized with the periodicity of the sub exposure times. Each OG pulse $P_{OG}$ may directly succeed one sub exposure pulse of the same type, e.g, an L-Tap pulse Pd, and may directly precede another sub exposure pulse of a different type, e.g., an S-Tap pulse Pa. Each OG pulse $P_{OG}$ may serve to discharge the photo-generated charges of the photodetector 410 remaining after the previous charge transfer. (The collective time duration of the OG pulses $P_{OG1}$-$P_{OGn}$ may be referred to as a discharge time period for the frame period, and the time period of each OG pulse may be referred to as a sub discharge time period of the discharge time period.) Note that additional OG pulses (not shown) may also be applied between temporally adjacent Pc and Pd pulses or Pa and Pb1 pulses, etc., if desired. In other embodiments, overflow circuitry is omitted and no OG pulses are applied.

After the last sub exposure pulse Pdn, a read-out period may be designated during which one or more select signals, e.g., SEL1 and SEL2, may be applied to the output circuit 240 (FIG. 2) in succession (as successive pulses). These signals may enable the four output voltages VOUTA-VOUTD to be output to the column line set 180i connected to pixel 120i. If a pair of column lines 180i are connected to pixel 120i, select signal SEL1 may enable read-out of two of the output voltages concurrently to the two column lines, respectively. Thereafter, the select signal SEL2 may enable read-out of the other two output voltages to the two column lines. In other examples, a single column line is connected to pixel 120i, or more than two column lines are connected, and the select signal scheme may be modified correspondingly. In the circuit of FIG. 6, SEL1 is concurrently applied to the gates of transistors SLXA and SLXD, and SEL2 is concurrently applied to the gates of transistors SLXB and SLXC. An example read-out method for CDS noise reduction as depicted in FIG. 5A is discussed further below.

The integrated exposure times EITS . . . EITL and sub exposure times ETS . . . ETL and number of sub exposure times per frame in FIGS. 5A-5B and other embodiments may be predetermined or dynamically adjustable times (e.g. from frame to frame) suitable to achieve desired performance metrics. These may be determined through experimentation, characteristics of photodetector 210, the pixel 120 circuitry, readout circuit 130 (e.g. ADC characteristics), and/or ambient environmental conditions. One example of an ambient environmental condition is the light intensity incident upon the pixel array 110. Intensity may be determined as an average intensity across the entire pixel array, and/or as highest and lowest localized intensities within the pixel array. A real time auto exposure (AE) algorithm may be executed by image processor 150 to calculate the intensity of a given frame, and based on the calculations, all or some of the exposure times for the next frame may be adjusted. When exposure times are adjusted based on local intensities, the adjustment may be understood as a contrast based adjustment. For example, if the scene has at least one very bright region locally captured by a block of pixels within the pixel array, the S-Tap exposure time for the next frame may be reduced below a default S-Tap exposure time. On the other hand, if no portion of the frame is very bright or very dark, the S-Tap exposure time for the next frame may be increased above the default S-Tap exposure time, and the L-Tap exposure time for the next frame may be reduced below a default L-Tap exposure time.

The example of FIGS. 5A-5B and 6 corresponds to a pixel architecture with four storage nodes that provide four respective output samples of luminance per frame, that is, the S-Tap, M1-Tap, M2-Tap and L-Tap samples (where each output voltage VOUTA, VOUTB, etc. represents a sample). In various alternative embodiments there may be: (i) only two samples per pixel, e.g., an S-Tap and an L-Tap sample; (ii) only three samples per pixel, e.g., an S-Tap, a single medium tap (M-Tap) and an L-Tap sample; (iii) five or more samples per pixel, such as an S-Tap, an L-Tap, and at least three M-Tap samples, or, (iv) in either of embodiments (ii) and (iii), there may be two or more S-Tap or L-Tap samples of equal exposure time to achieve additional noise reduction for the short and long exposures.

Further, in any of the above cases (including the embodiment of FIGS. 5A-5B), the same number "n" of sub exposure times may be designated for each of the taps, such that the sub exposure times between the taps are synchronized. Thus, each of the sub exposure times is periodically repeated at the same frequency over the frame (n sub exposure times per a common portion of the frame period), albeit with different duty cycles for the S-Tap, L-Tap and at least one of the M1/M2 taps. In other embodiments, the frequency of sub exposure times may differ for the different respective taps, and/or the sub exposure times of different taps may be unsynchronized.

Referring still to FIGS. 5A and 6, the multi-tap architecture of pixel 120i may allow for CDS noise reduction in the following manner: a readout/resetting period may begin at a time t2 corresponding to the falling edge of the last L-tap pulse Pdn. Until this time, reset signals RG (e.g. RG1 and RG2) applied to the gates of transistors RXA-RXD may have been set high to continually discharge the FD nodes. Alternatively, an RG pulse is applied just prior to time t2. At time t2, the RG signal changes state to initiate a noise sampling at the FD nodes. To implement noise sampling, a SEL1 pulse $P_{S1}$-1 may be applied at time t2, which produces the output voltages VOUTA and VOUTD as amplified versions of the FDA noise voltage and the FDD noise voltage, respectively. These amplified noise voltages respectively appear on column lines 180i-1 and 180i-2 and are sampled by readout circuitry 130. A SEL2 pulse $P_{S2}$-1 may then follow, resulting in amplified noise samples for nodes FDB and FDC being obtained by readout circuitry 130 in an analogous manner. The SEL2 pulse $P_{S2}$-1 may have a trailing edge at time t3.

A transfer period 511 may then follow at time t3 and extend to time t4, during which the second shuttle transistors TGX2 are turned ON by pulses 511 of shuttle gate signals TG2 applied to their gates. This transfers the photocharge packets ("signals") stored by storage transistors SGX at storage areas SDA-SDD to the respective storage nodes FDA-FDD, causing the FD storage node voltages $V_{FDA}$-$V_{FDD}$ to increase to levels defined by "signal plus noise". Another set of SEL pulses, $P_{S1}$-2 and $P_{S2}$-2, may then be applied in succession between times t4 and t5, whereby the FD storage node voltages are amplified to produce output voltages VOUTA-VOUTD, respectively, representing the photocharge generated in the corresponding exposure integration times, plus noise. These "signal plus noise" voltages are sampled by readout circuit 130, which subtracts the level of the noise sample just taken to remove the noise, completing a correlated double sampling operation to obtain a more accurate luminance sample. For global shutter operations, a global reset period may follow at time t5 and extend to the end of the frame period. In the global reset period, both the RG signals and TG2 signals may transition high, so that residual charge is drained from both the SD areas and the FD nodes. Additionally, the OG pulse POGN may continue high from time t2 to the end of the global reset period, to continually drain unwanted photocharge from photodiode 410. (Note that rolling shutter operations are alternatively configurable, in which case the readout/resetting period may not be synchronized for each of the rows of the image sensor array.)

The pixel circuit design of FIG. 6 can be modified to reflect alternative embodiments using different HDR approaches. For instance, as noted above, an image sensor that classifies luminance ranges for HDR image data into just two ranges, for low and high luminance, may employ only two taps. In this case, photodetector 410 may include only two photogates such as PGA and PGD; transfer circuitry 420 may include only two circuit parts 420A and 420D; etc. In other examples, pixel architectures with three taps, or more than four taps may be designed. It is noted here that the pixel architecture of FIG. 6 may be an architecture similar or identical to a multi-tap pixel of a known time-of-flight (ToF) image sensor, but driven with control signals according to the inventive concept in the manner described herein at different exposure periods within each frame to generate corresponding HDR voltage samples.

Figure 7:
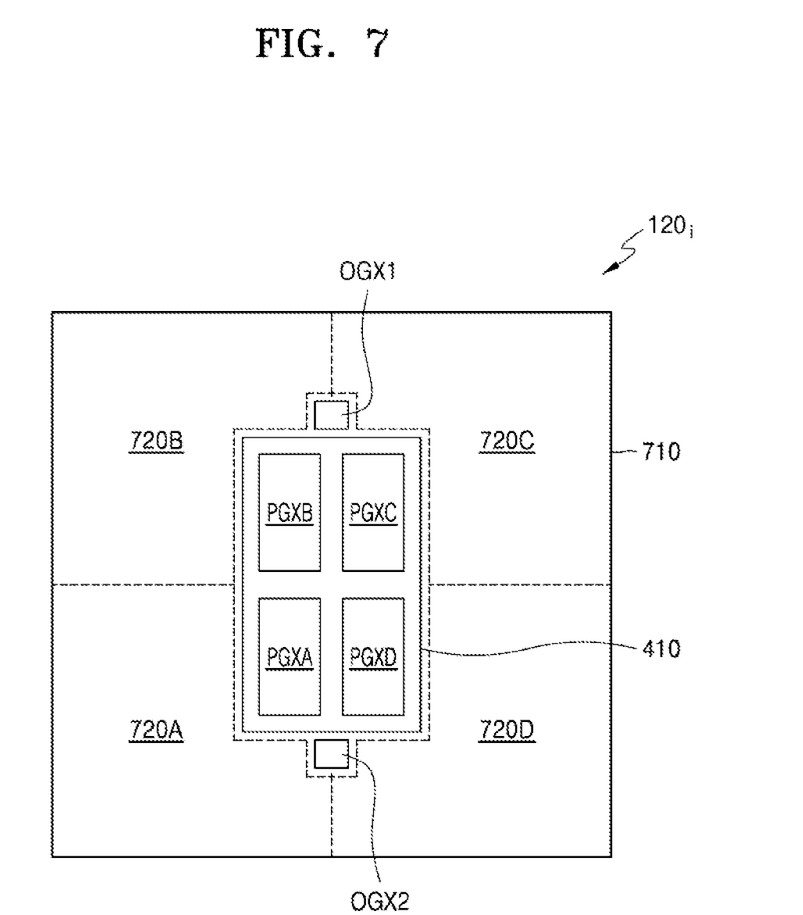
FIG. 7 is a plan view of an example arrangement of circuit areas within a pixel.

FIG. 7 is a plan view of one example layout of circuit areas within pixel 120i of FIG. 6. Here, pixel 120i is configured with a semiconductor substrate 710 suitably doped and metallized in a rectangular central region thereof to form photodetector 410. Photogates PGXA-PGXD may be formed as doped and metallized rectangular regions of the same size, arranged symmetrically in two rows and columns within the perimeter of photodetector 410. In other embodiments, photogates PGXA-PGXD are situated at left, right, top and bottom edge locations of the central region. Overflow control circuitry 250 may be embodied as a pair of overflow transistors OGX1 and OGX2 at opposite ends of the central region. Peripheral regions 720A, 720B, 720C and 720D may include the circuitry within the S-tap, the M1-tap, the M2-tap and the L-tap, respectively. For instance, region 720A may include transfer circuit part 420A, storage node FDA, reset transistor RXA, drive transistor DXA and select transistor SLXA of the S-tap; and the other regions 720B-720D may include the corresponding circuitry for the other taps.

Figure 8:
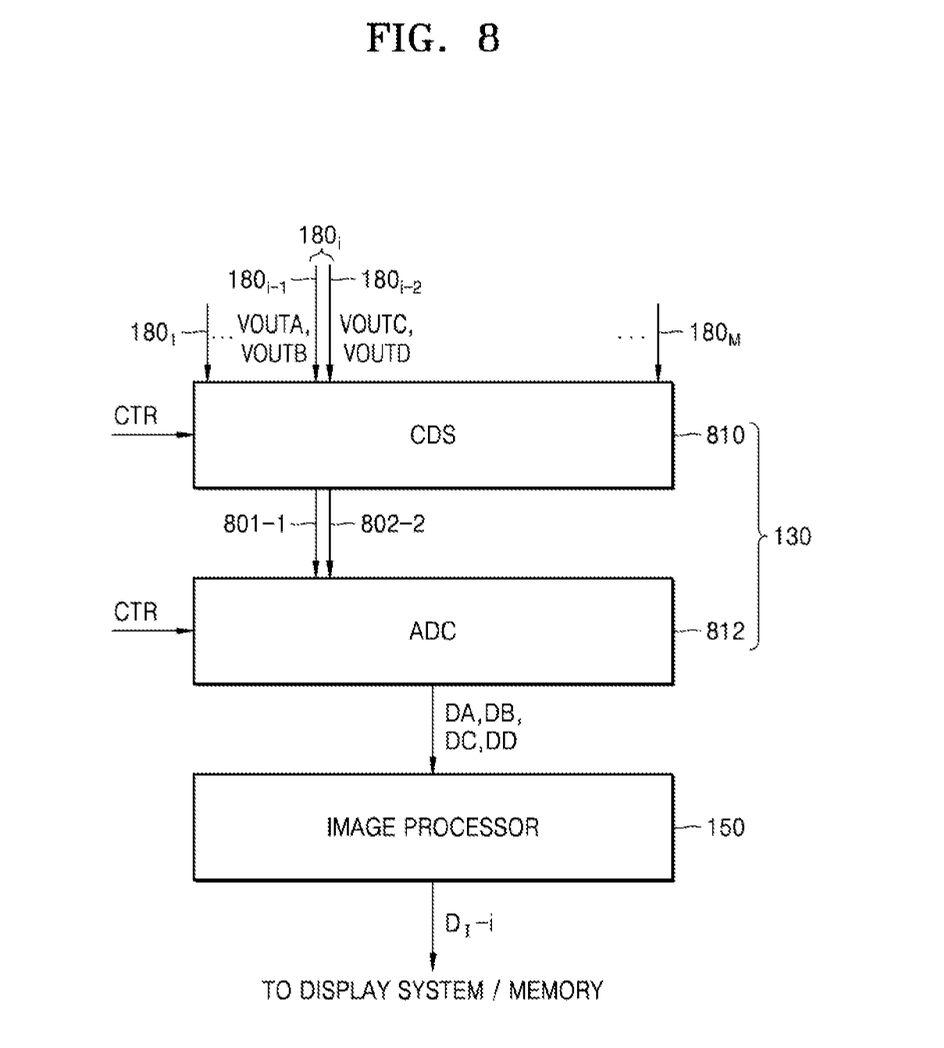
FIG. 8 is a diagram illustrating example read-out and HDR image data generation operations within the image sensor.

FIG. 8 is a diagram illustrating example read-out and HDR image data generation operations with respect to a pixel 120$i$ of the pixel array 110. Read-out circuit 130 may include a CDS circuit 810 and an ADC circuit 812. CDS circuit 810 may sample the voltages VOUTA-VOUTD appearing on column lines 180$i$-1 and 180$i$-2 at relevant times during an image frame cycle as determined by timing and control signals CTR received from control circuit 140. Thus, as described above for FIGS. 5A-B and 6, CDS circuit 810 may sample each of voltages VOUTA-VOUTD during a frame read-out interval to obtain one sample for noise and one sample for "signal plus noise". The noise may then be subtracted to provide a noise reduced analog voltage sample for each of the S-tap, the M1-tap, the M2-tap and the L-tap exposures. These analog samples may then be output in parallel to ADC 812 on lines 801-1 and 801-2, or alternatively, during different time intervals on a single output line 801. ADC 812 may digitize the analog samples to provide n-bit data signals DA, DB, DC and DD representing the photocharges at storage nodes FDA-FDD corresponding to voltages VOUTA, VOUTB, VOUTC and VOUTD, respectively. The data signals may be output from ADC 812 to image processor 150. Image processor 150 may then select one of these data signals, based on their values, to generate HDR output data D$_r$-i for the pixel 120$i$ of the current frame to a display system and/or memory 170. The selection may change from frame to frame based on the amount of luminance detected by pixel 120$i$. For instance, if data signal DA represents a luminance amount less than a first threshold, indicative of a relatively dark condition, data signal DA may be selected. If data signal DD indicates a value above a second threshold (higher than the first threshold) indicative of a relatively bright condition, data signal DD may be selected. As discussed above, data signals DB and DC may be averaged by image processor 150 to reduce noise, and the averaged value represents luminance data within a single intermediate brightness range. The average of DB and DC may be selected as the output data D$_r$-i if all the luminance data for the pixel 120$i$ indicates an intermediate range luminance condition—e.g., if data signal DA is at a maximum of its n-bit range and data signal DD is at a minimum of its n-bit range. Alternatively, data signals DB and DC correspond to different exposure times/luminance ranges. In any event, whether the final HDR data corresponds to a selected one of only two luminance ranges, or to a selected one of three or more luminance ranges, improved resolution and dynamic range without the need for additional ADC complexity is realizable through such HDR data generation and frame to frame data selection.

Figure 9:
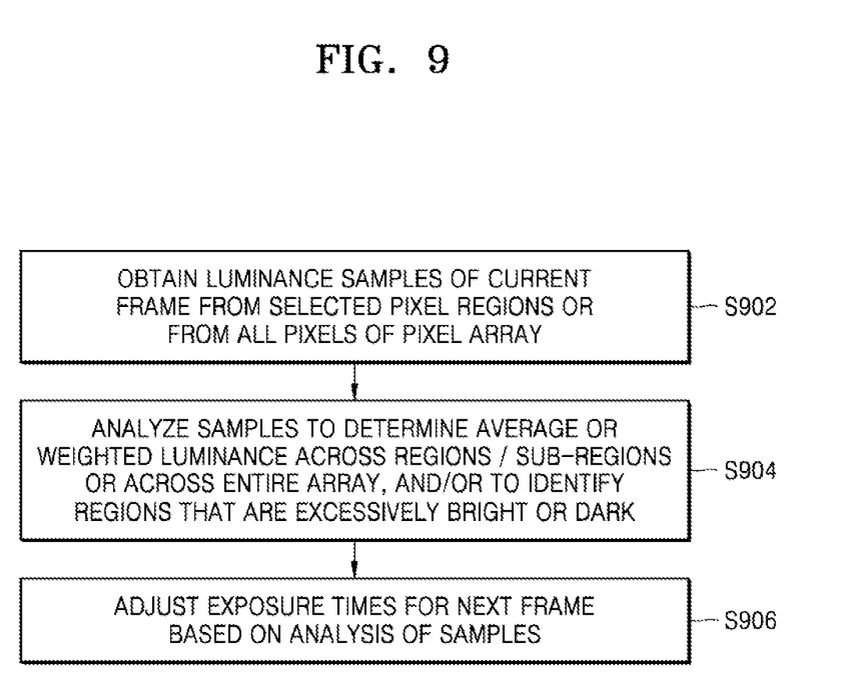
FIG. 9 is a flow chart illustrating an example of exposure time adjustment for the image sensor based on a real time automatic exposure algorithm.

FIG. 9 is a flow chart illustrating an example method for exposure time adjustment in image sensor 100 based on a real time automatic exposure algorithm executed by image processor 150. In the method, luminance samples (e.g. data DA-DD) for a current frame from selected pixel regions or all pixels 120$_1$-120$_N$ of pixel array 110 may be obtained by image processor 150 (S902). For instance, if the current frame is a first frame of a video sequence, the pixels 120 may have each been driven with default exposure times ET$_S$, ETM$_1$, ETM$_2$ and ET$_L$ for the respective taps. Image processor 150 may then analyze the samples to determine average or weighted luminance across selective regions/sub-regions or the entire pixel array 110 to determine whether the overall captured image/selective regions are too bright or too dark (S904). Alternatively, average luminance is determined on a localized basis, across smaller blocks of pixels, to identify regions/sub-regions that are excessively bright or dark (S904). Image processor 150 may then adjust the exposure times ET$_S$, etc. for the next frame based on the analysis of the samples (S906). To this end, if the current frame is determined to be too dark (average luminance across the entire array or pixel block under consideration is below a first threshold), the exposure times are increased in the next frame. This may be done increasing the sub exposure times of each tap, while the number n of sub exposure pulses for each of the taps may either be maintained or correspondingly changed. Conversely, if the current frame is too bright, the exposure times in the next frame may be decreased.

Exemplary embodiments of the inventive concept have been described herein with reference to signal arrows, block diagrams and algorithmic expressions. Each block of the block diagrams, and combinations of blocks in the block diagrams, and operations according to the algorithmic expressions can be implemented by hardware (e.g. logic/processing/control circuitry within image processor 150, control circuit 140 and/or readout circuit 130) accompanied by computer program instructions. Such computer program instructions may be stored in a non-transitory computer readable medium (e.g. memory 170 or an internal memory of control circuit 140) that can direct a computer, other programmable data processing apparatus, or other devices to function in a particular manner, such that the computer readable medium is an article of manufacture including instructions which, when executed, implement the function/act specified in the flowchart and/or block/schematic diagram. The term "processor" as used herein is intended to include any processing device, such as, for example, one that includes a central processing unit (CPU) and/or other processing circuitry (e.g., digital signal processor (DSP), microprocessor, etc.). Moreover, a "processor" includes computational hardware and may refer to a multi-core processor that contains multiple processing cores in a computing device. Herein, the term "circuit" is used to denote either a stand-alone circuit or a circuit part ("circuitry") of a higher level circuit.

While the inventive concepts described herein have been particularly shown and described with reference to example embodiments thereof, it will be understood by those of ordinary skill in the art that various changes in form and details may be made therein without departing from the spirit and scope of the claimed subject matter as defined by the following claims and their equivalents.

What is claimed is:

1. An image sensor comprising:
   control circuitry to generate control signals;
   a plurality of pixels each comprising:
   a photodetector that receives incident light;
   first, second, third and fourth storage nodes; and
   transfer circuitry responsive to the control signals to transfer first charges, second charges, third charges, and fourth charges generated by the photodetector during respective first, second, third and fourth exposure times within a frame period to the first, second, third and fourth storage nodes, respectively, the first exposure time being less than the second through fourth exposure times, the second and third exposure times being equal and less than the fourth exposure time, the first, second, third and fourth exposure times being respective integrated exposure times of sequences of first, second, third and fourth sub exposure times, respectively, the sequences being interspersed with one another during the frame period; and an image processor to generate image frame data based on output voltage samples derived from the first, second, third and fourth charges of each of the plurality of pixels, to generate high dynamic range (HDR) data of a high luminance range and a low luminance range based on the output voltage samples corresponding to the first charges and the fourth charges, respectively, and to average luminance data of output voltage samples corresponding to the second and third charges to generate HDR data of a single intermediate luminance range.

2. The image sensor of claim 1, wherein the first through fourth sub exposure times are each repetitive time intervals recurring at the same frequency within the frame period.

3. The image sensor of claim 1, further comprising a readout circuit coupled between the plurality of pixels and the image processor, to read out the output voltage samples during an end portion of the frame period; and wherein each said pixel comprises resetting circuitry to reset voltages at each of the first and second nodes following read-out of the output voltage samples.

4. The image sensor of claim 3, wherein the readout circuit comprises a correlated double sampling circuit and an analog to digital converter (ADC).

5. The image sensor of claim 1, wherein the photodetector comprises a photodiode and first through fourth photogates through which the first through fourth charges are transferred, respectively.

6. The image sensor of claim 1, wherein each of the plurality of pixels further comprises at least one overflow gate transistor, responsive to one of the control signals to discharge capacitance of the photodetector during a discharge time period within the frame period.

7. The image sensor of claim 6, wherein at least a portion of the discharge time period is within an end portion of the frame period following the first and second exposure times.

8. The image sensor of claim 7, wherein:

a further portion of the discharge time period comprises a plurality of discharge time sub periods, each between a set of adjacent first through fourth sub exposure times and a succeeding set of adjacent first through fourth sub exposure times.

9. The image sensor of claim 1, wherein the image processor executes instructions to run a real time auto exposure algorithm and cooperates with the control circuitry to set the first through fourth exposure times in accordance with a result of the auto exposure algorithm.

10. The image sensor of claim 1, wherein the first through fourth storage nodes are each floating diffusion (FD) nodes, and the transfer circuitry further comprises a first storage transistor coupled between the photodetector and the first storage node in a first tap, a second storage transistor coupled between the photodetector and the second storage node in a second tap, a third storage transistor coupled between the photodetector and the third storage node in a third tap, a fourth storage transistor coupled between the photodetector and the fourth storage node in a fourth tap, each of the first through fourth storage transistors including storage areas for interim storage of the first through fourth charges, respectively.

11. An operating method of an image sensor comprising a plurality of multi-tap pixels and at least one overflow gate transistor, the method comprising:

for each of the multi-tap pixels:

during an exposure frame period, activating a photodetector responsive to incoming light for a plurality K of exposure periods and thereby accumulate K respective photocharge packets, at least two of the K exposure periods being of different lengths, wherein each of the K exposure periods is an integrated exposure period of a respective one of K sequences of a plurality n of sub exposure periods, each of the K sequences being interspersed with each of the other of the K sequences;

transferring the photocharge packets to K storage nodes within the respective pixel;

applying control signals to the at least one overflow gate transistor to discharge capacitance of the photodetector during a discharge time period within the frame period, wherein one portion of the discharge time period is within an end portion of the frame period following the K exposure periods, and a further portion of the discharge time period comprises a plurality of discharge time sub periods, each between a set of adjacent first through K sub exposure times and a succeeding set of adjacent first through K sub exposure times;

obtaining voltage samples from the plurality of multi-tap pixels based on the photocharge packets in the K storage nodes of each of the multi-tap pixels; and generating high dynamic range (HDR) image frame data based on the voltage samples.

12. The operating method of claim 11, wherein said transferring the photocharge packets to K storage nodes comprises first transferring the photocharge packets from the photodetector to K storage areas of K respective storage transistors, and subsequently transferring the photocharge packets from the K storage areas to the K storage nodes following noise sampling of the K storage nodes.

13. A non-transitory computer-readable recording medium storing instructions that, when executed by at least one processor of an image sensor comprising a plurality of multi-tap pixels, implement a method that comprises:

for each of the multi-tap pixels:

during an exposure frame period, activating a photodetector responsive to incoming light for first through fourth exposure times and thereby accumulating first through fourth respective photocharge packets, the first exposure time being less than the second through fourth exposure times, the second and third exposure times being equal and less than the fourth exposure time, each of the first through fourth exposure times being an integrated exposure time of a respective one of first through fourth sequences of a plurality n of sub exposure times, each of the first through fourth sequences being interspersed with each of the other of the first through fourth sequences;

transferring the first through fourth photocharge packets to first through fourth-storage nodes, respectively, within the respective pixel;

obtaining correlated double sampling (CDS) voltage samples based on the photocharge packets in the first through fourth storage nodes of each of the plurality of multi-tap pixels;

digitizing the CDS voltage samples; and generating high dynamic range (HDR) image frame data from the digitized CDS voltage samples, which comprises, for each of the multi-tap pixels, generating HDR pixel data of a high luminance range and a low luminance range based on the CDS voltage samples corresponding to the first photocharge packets and the fourth photocharge packets, respectively, and averaging luminance data of the CDS voltage samples corresponding to the second and third photocharge packets to generate HDR data of a single intermediate luminance range.

* * * * *